A. P. GUBRUD.
MACHINE FOR PREPARING AND RIDGING CORN GROUND.
APPLICATION FILED APR. 17, 1907.
928,122.
Patented July 13, 1909
2 SHEETS—SHEET 2.
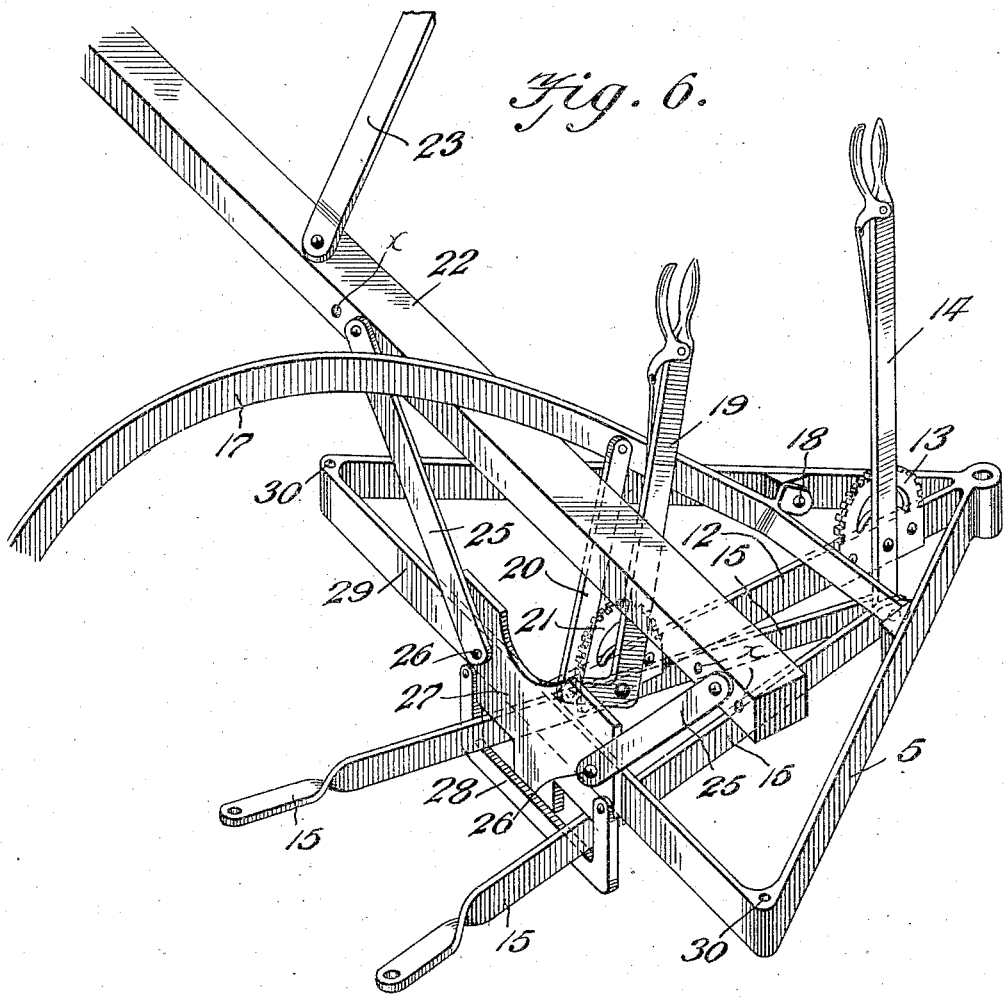
Witnesses
Frank B. Hoffman
Inventor
Adolph P. Gubrud
By Victor J. Evans
Attorney

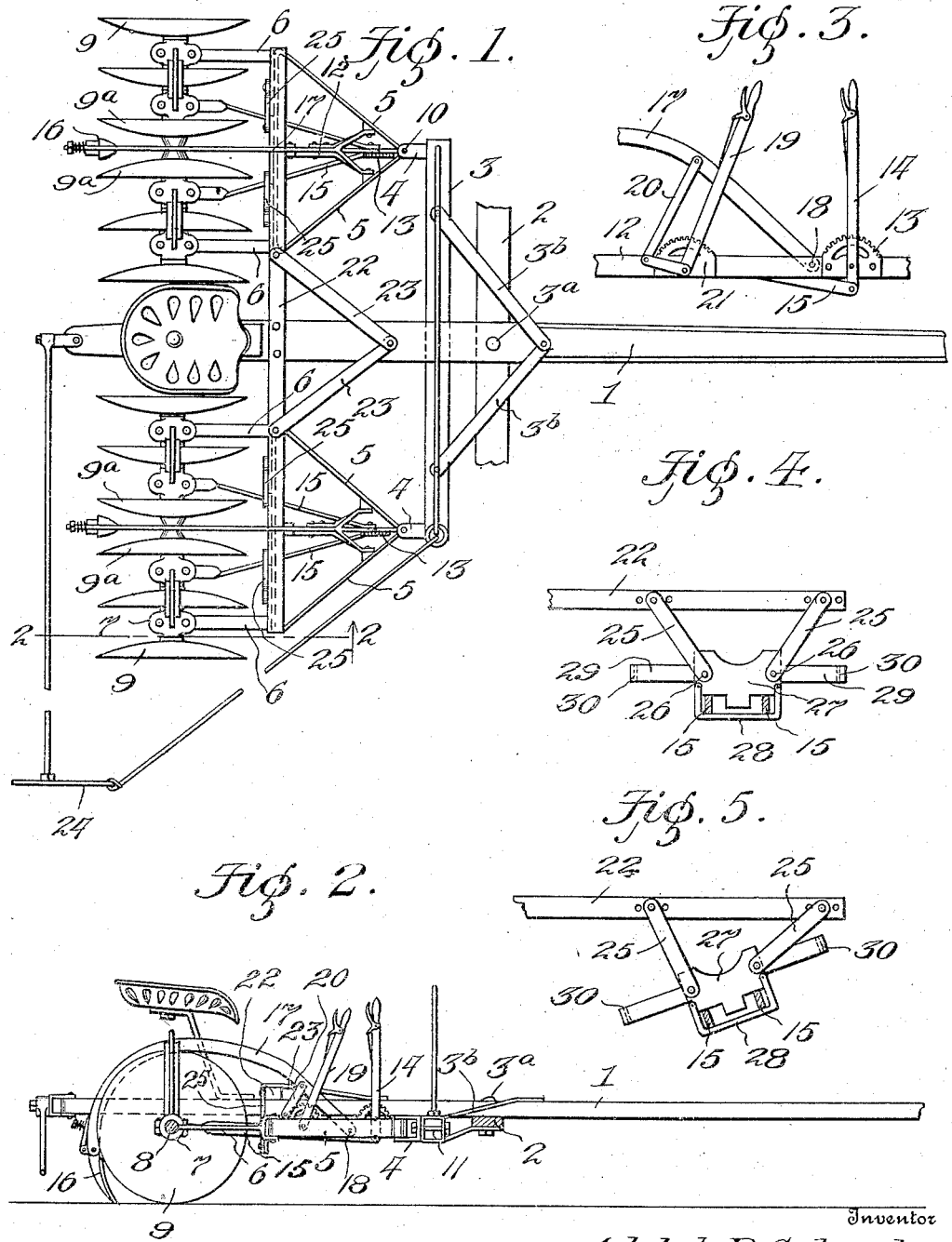

UNITED STATES PATENT OFFICE.

ADOLPH P. GUBRUD, OF HUDSON, SOUTH DAKOTA.

MACHINE FOR PREPARING AND RIDGING CORN-GROUND.

No. 928,122.   Specification of Letters Patent.   Patented July 13, 1909.

Application filed April 17, 1907. Serial No. 368,651.

*To all whom it may concern:*

Be it known that I, ADOLPH P. GUBRUD, a citizen of the United States of America, residing at Hudson, in the county of Lincoln and State of South Dakota, have invented new and useful Improvements in Machines for Preparing and Ridging Corn-Ground, of which the following is a specification.

This invention relates to machines for preparing and ridging ground for planting corn, and one of the principal objects of the same is to provide a machine that will operate efficiently on soils of different characters to form furrows for planting corn, and for removing weeds and grass to prevent choking of the corn.

Another object of the present invention is to improve the construction of the machine shown in my Patent No. 766,823, dated August 9, 1904, with a view to rendering the machine more rigid in bracing and to provide improved means for controlling the tilting movement of the gangs of disks connected at opposite sides of the pole or tongue.

These and other objects may be attained by means of the construction illustrated in the accompanying drawing, in which:

Figure 1 is a plan view of a machine embodying my invention. Fig. 2 is a longitudinal section on the line 2—2, Fig. 1, looking in the direction indicated by the arrow. Fig. 3 is a detail side elevation of the lever mechanism and connections. Fig. 4 is a detail elevation of one of the supporting devices for the draft connections of the disk gangs. Fig. 5 is a similar view showing one of the positions which the supporting device may assume in passing over rough or uneven ground. Fig. 6 is a perspective view of the connections for tilting one gang of disks.

Referring to the drawing for a more particular description of my invention, the numeral 1 designates a draft pole, and 2 is a doubletree connected thereto by means of the pivot bolt $3^a$. A cross bar 3 is connected to the pole 1 and a pair of braces $3^b$ extending from the cross bar 3 to the pole. Connected to the ends of the cross bar 3 are clevises 4 and connected to these clevises upon opposite sides of the pole are the diverging draft bars 5, which are bent around at their rear ends to form a triangular frame, the rear corners of which are connected by means of links 6 to the bearings 7 surrounding the shafts 8 which carry the disks 9.

The rear side of the triangular frame is designated by the numeral 29.

Since the gangs of disks are of identical construction and arrangement upon opposite sides of the pole 1, a description of one of said gangs will suffice for both. The draft bars 5 are connected to the clevises 4 by a vertical pin 10, and the clevises 4 are connected to the cross bar 3 by means of a horizontal pivot pin 11, Fig. 2. A brace bar 12 is connected to the frame, extending from the front of the draft bars 5 to the rear bar of the triangular frame and is connected to the beam 17 hereinafter referred to and is provided with a sector rack 13 to which a lever 14 is pivoted, said lever being connected at its lower end to the front ends of a pair of diverging bars 15, the rear ends of said bars being connected to the bearings 7 at opposite sides of the central disks $9^a$. There are two gangs of disks on each side of the draft tongue.

A shovel or furrower 16 is connected to the lower end of a curved beam 17, the front end of which is pivoted at 18 to the bars 5, and a lever 19 is pivoted to the bar 12 and connected by means of a link 20 to the beam 17, while a rack 21 on the bar 12 is provided for holding the lever 19 in adjusted position to raise or lower the shovel 16.

An extended cross bar 22 is secured to the pole 1 and is provided with braces 23 extending therefrom to the pole 1.

A marker 24 of the usual or any suitable construction may be connected to the machine.

The parts thus far described are similar to or substantially identical with those disclosed in my patent hereinbefore referred to.

Adjustably pivoted to the cross bar 22 are links 25, said links being pivotally connected at 26 to a supporting plate 27, said supporting plate having a bail or stirrup 28 connected thereto, and the diverging bars 15 extend between the stirrup and the supporting plate 27, as shown in Fig. 4. The cross bar 22 is provided with a series of holes $x$, and the links 25 may be adjustable by means of the pivot pin or bolt inserted through said holes $x$ and through the link to raise and lower the triangular frames and the harrow disks. This supporting device or plate is secured to the rear side 29 of the triangular frame.

The operation of my invention may be briefly described as follows: The disks are set at the required angle or inclination by means of the lever 14 and the machine is started over the ground, the disks forming furrows in the soil wherein the corn is to be planted. By altering the relative positions of the disks and their shafts with respect to the direction of movement of the machine, the soil can be pulverized, and the grass cut. As the machine moves along, the gangs of disks may move upward or downward to tilt the supporting device 27 to either side upon the links 25. The pulverizing effect can be readily obtained by angling the position of the disks and their shaft with respect to the direction of movement of the machine.

From the foregoing it will be obvious that the supporting device for the bars 15 is supported at two points, and connected at two widely separated points on the cross bar 22, the result of which is that at any movement of the disk gangs the supporting device is sustained by means of the links, and the movement is limited as will be understood.

Having thus described the invention, what I claim is:

1. In a machine of the character described, the combination of a pole, a cross bar connected to said pole, a triangular frame connected to each end of said cross bar, an extended cross bar connected to the pole in rear of the first mentioned cross bar, gangs of disks upon opposite sides of the pole, said triangular frames each being provided with a rear bar, a plate secured to said rear bar, links pivotally connected to said plate and adjustably connected to said cross bar, a stirrup, bars extending from the disk gangs through said stirrup, and a lever for adjusting said bars.

2. A supporting device for draft bars comprising a triangular frame having a rear bar, a plate connected to said bar, a draft tongue, a cross bar connected to said tongue, an extended cross bar secured to the tongue in rear of said first mentioned cross bar, links adjustably connected to the extended cross bar and pivoted to said plate, a stirrup connected to said plate and depending therefrom, gangs of disks, bars connected to said disk gangs and extending through said stirrup, a lever connected to the front ends of said bars for adjusting the same, a curved beam pivoted to each of said triangular frames, a furrower on said beam, and a lever for raising and lowering said beam.

In testimony whereof, I affix my signature in presence of two witnesses.

ADOLPH P. GUBRUD.

Witnesses:
P. A. OVERSETH,
C. H. CASSILL.